United States Patent
Degner et al.

(10) Patent No.: US 8,132,293 B2
(45) Date of Patent: Mar. 13, 2012

(54) PORTABLE COMPUTER CLUTCH STRUCTURES

(75) Inventors: Brett W. Degner, Menlo Park, CA (US); Patrick Kessler, Mountain View, CA (US); Chris Ligtenberg, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 609 days.

(21) Appl. No.: 12/335,520

(22) Filed: Dec. 15, 2008

(65) Prior Publication Data

US 2010/0088853 A1    Apr. 15, 2010

Related U.S. Application Data

(60) Provisional application No. 61/105,031, filed on Oct. 13, 2008.

(51) Int. Cl.
*E05C 17/64* (2006.01)

(52) U.S. Cl. .............. 16/342; 16/277; 16/285; 16/295

(58) Field of Classification Search ............ 16/342, 16/374, 376, 381, 392, DIG. 43, 285, 289, 16/290, 307, 308, 337; 248/573, 917, 919, 248/922, 923
See application file for complete search history.

(56) References Cited

U.S. PATENT DOCUMENTS

| | | | |
|---|---|---|---|
| 5,287,596 A * | 2/1994 | Chen et al. ............ | 16/331 |
| 5,325,984 A | 7/1994 | Ady et al. | |
| 5,566,048 A | 10/1996 | Esterberg et al. | |
| 5,608,604 A * | 3/1997 | Francis ............ | 361/679.28 |
| 5,771,539 A * | 6/1998 | Wahlstedt et al. ............ | 16/285 |
| 6,249,426 B1 | 6/2001 | O'Neal et al. | |
| 6,297,946 B2 | 10/2001 | O'Neal et al. | |
| 6,304,433 B2 | 10/2001 | O'Neal et al. | |
| 6,671,929 B1 * | 1/2004 | Lu ............ | 16/342 |
| 6,748,625 B2 * | 6/2004 | Lu ............ | 16/285 |
| 6,779,234 B1 * | 8/2004 | Lu et al. ............ | 16/340 |
| 6,820,307 B2 * | 11/2004 | Lu ............ | 16/342 |
| 6,868,582 B2 * | 3/2005 | Lu et al. ............ | 16/342 |
| 6,986,188 B2 * | 1/2006 | Lu et al. ............ | 16/330 |
| 7,513,014 B2 * | 4/2009 | Lin ............ | 16/374 |
| 7,543,358 B2 * | 6/2009 | Lin et al. ............ | 16/342 |
| 2003/0046793 A1 * | 3/2003 | Novin et al. ............ | 16/342 |
| 2003/0126719 A1 * | 7/2003 | Chen ............ | 16/342 |
| 2004/0049886 A1 * | 3/2004 | Lu ............ | 16/342 |
| 2004/0049887 A1 * | 3/2004 | Lu ............ | 16/342 |
| 2007/0136996 A1 * | 6/2007 | Chen et al. ............ | 16/342 |

\* cited by examiner

*Primary Examiner* — Victor Batson
*Assistant Examiner* — Roberta Delisle
(74) *Attorney, Agent, or Firm* — Treyz Law Group; G. Victor Treyz; David C. Kellogg (57) ABSTRACT

A portable computer is provided that has a housing. Upper and lower portions of the housing may be joined using a hinge. A clutch mechanism may be associated with the hinge. The clutch mechanism may exhibit asymmetrical friction during opening and closing of the portable computer housing portions. Additional closing force may help to prevent the computer from having a lid that is too easy to close, without overwhelming the clutch with unnecessary friction. The clutch may have a clutch spring that is attached to a clutch shaft using a slot in the shaft. A lobe may be provided in the spring in the vicinity of the slot. A protective cap may be provided over the tip of the shaft to prevent damage to nearby wires. A friction band in the clutch may be used to directly engage an end of the spring.

15 Claims, 9 Drawing Sheets

PORTABLE COMPUTER CLUTCH STRUCTURES

This application claims the benefit of provisional patent application No. 61/105,031, filed Oct. 13, 2008, which is hereby incorporated by reference herein in its entirety.

BACKGROUND

This invention relates to electronic devices and, more particularly, to clutch structures for hinges in electronic devices such as portable computers.

Portable computers typically have upper and lower housing portions that are connected by a hinge. The lower housing portion contains components such as printed circuit boards, disk drives, a keyboard, and a battery. The upper housing portion contains a display. When the computer is in an open configuration, the upper housing portion is vertical and the display is visible to the user of the portable computer. When the computer is closed, the upper housing lies flat against the lower housing. This protects the display and keyboard and allows the portable computer to be transported.

Portable computer hinges are challenging to design. It is generally desirable to make a hinge easy to manipulate. A hinge with an overly stiff clutch mechanism may require a user of the computer to use undesirably large amounts of force to pry open the display when using the computer. Stiff hinge clutches may resist opening to such an extent that the entire base of the computer will be lifted upwards if a user attempts to open a display using only one hand. To address these concerns, clutches may be made that are less stiff. Although clutches such as these may be more pleasing to use, they may not always prevent unintended movement of the upper housing relative to the main housing.

It would therefore be desirable to be able to provide improved clutch structures for hinges in electronic devices such as portable computers.

SUMMARY

A portable computer with improved hinge clutch structures is provided. A clutch may be provided that has asymmetric closing and opening forces produced by friction band members of different sizes. A protective cap may be formed over the tip of the clutch to prevent damage to nearby wires. A slotted tip may be provided on a clutch shaft to engage a clutch spring. A lobe may be formed in the spring in the vicinity of the slotted tip to provide stress relief. A retaining ring may help to retain the end of the clutch spring in the slot.

The clutch spring may be directly attached to a friction band portion of the clutch by a bent portion of the friction band portion. This direct engagement arrangement allows complex multi-part structures to be avoided.

Further features of the invention, its nature and various advantages will be more apparent from the accompanying drawings and the following detailed description of the preferred embodiments.

DETAILED DESCRIPTION

The present invention relates to portable computer structures such as hinge structures.

Figure 1:
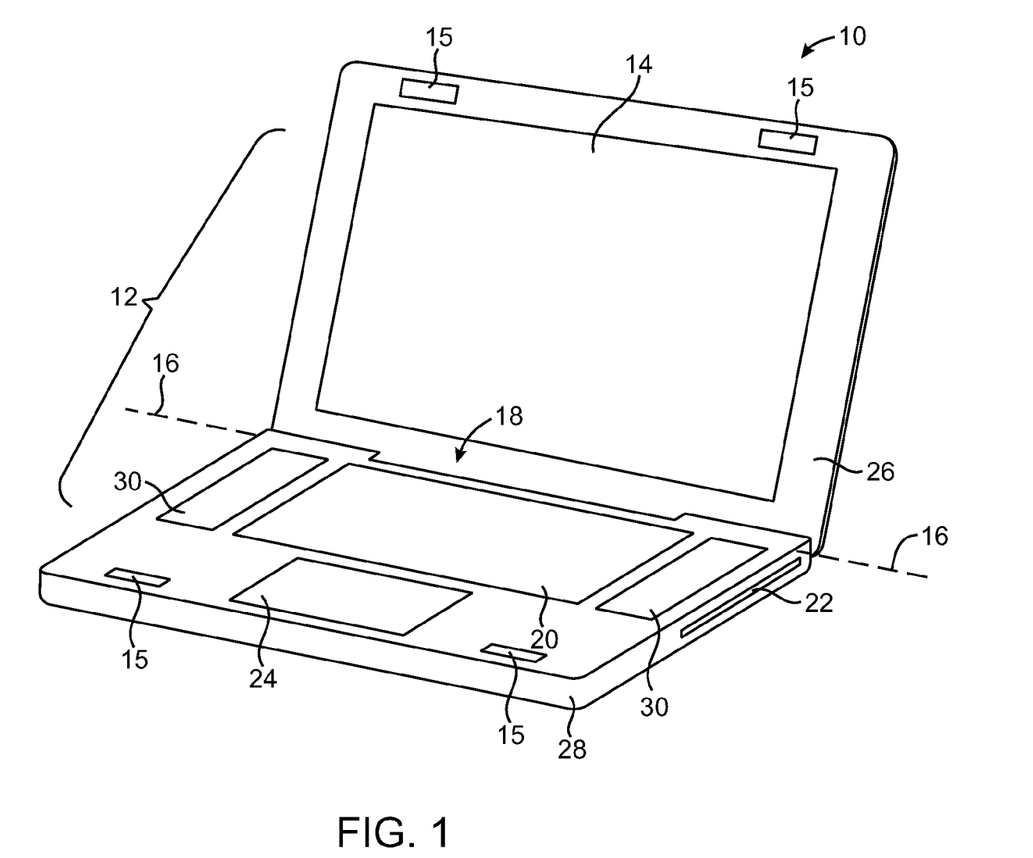
FIG. 1 is a perspective view of an illustrative portable computer with hinge clutch structures in accordance with an embodiment of the present invention.

An illustrative electronic device such as a portable computer in which the portable computer hinge structures may be provided is shown in FIG. 1. As shown in FIG. 1, portable computer 10 may have a housing 12. Housing 12, which is sometimes referred to as a case, may be formed from one or more individual structures. For example, housing 12 may have a main structural support member that is formed from a solid block of machined aluminum or other suitable metal. One or more additional structures may be connected to the housing 12. These structures may include, for example, internal frame members, external coverings such as sheets of metal, etc. Housing 12 and its associated components may, in general, be formed from any suitable materials such as such as plastic, ceramics, metal, glass, etc. An advantage of forming housing 12 at least partly from metal is that metal is durable and attractive in appearance. Metals such as aluminum may be anodized to form an insulating oxide coating.

Case 12 may have an upper portion 26 and a lower portion 28. Lower portion 28 may be referred to as the base or main unit of computer 10 and may contain components such as a hard disk drive, battery, and main logic board. Upper portion 26, which is sometimes referred to as a cover or lid, may rotate relative to lower portion 28 about rotational axis 16. Portion 18 of computer 10 may contain a hinge and associated clutch structures and is sometimes referred to as a clutch barrel.

Lower housing portion 28 may have a slot such as slot 22 through which optical disks may be loaded into an optical disk drive. Lower housing portion may also have a touchpad such as touchpad 24 and may have keys 20. If desired, additional components may be mounted to upper and lower housing portions 26 and 28. For example, upper and lower housing portions 26 and 28 may have ports to which cables can be connected (e.g., universal serial bus ports, an Ethernet port, a Firewire port, audio jacks, card slots, etc.). Buttons and other controls may also be mounted to housing 12.

If desired, upper and lower housing portions 26 and 28 may have transparent windows through which light may be emitted (e.g., from light-emitting diodes). This type of arrangement may be used, for example, to display status information to a user. Openings may also be formed in the surface of upper and lower housing portions to allow sound to pass through the walls of housing 12. For example, openings may be formed for microphone and speaker ports. With one illustrative arrangement, speaker openings such as speaker openings 30 may be formed in lower housing portion 28 by creating an array of small openings (perforations) in the surface of housing 12.

A display such as display 14 may be mounted within upper housing portion 26. Display 14 may be, for example, a liquid crystal display (LCD), organic light emitting diode (OLED) display, or plasma display (as examples). A glass panel may be mounted in front of display 14. The glass panel may help add structural integrity to computer 10. For example, the glass panel may make upper housing portion 26 more rigid and may protect display 14 from damage due to contact with keys or other structures.

Computer 10 may have input-output components such as touch pad 24. Touch pad 24 may include a touch sensitive surface that allows a user of computer 10 to control computer 10 using touch-based commands (gestures). A portion of touchpad 24 may be depressed by the user when the user desires to "click" on a displayed item on screen 14.

Hinge 18 may include clutch structures. These clutch structures provide friction and stabilizing forces that allow a user to smoothly open and close lid 26 of computer 10. A satisfactory hinge 18 has clutch structures that are not excessively resistive. A hinge with an overly resistive clutch will make it difficult to open lid 26 of housing 12 smoothly. For example, a stiff hinge may cause lower housing 28 to lift up from a table top as a user attempts to lift lid 26. At the same time, a weak hinge will not be satisfactory. If a hinge is too weak, small disturbances will cause lid 26 to fall open or slam shut.

Figure 2:
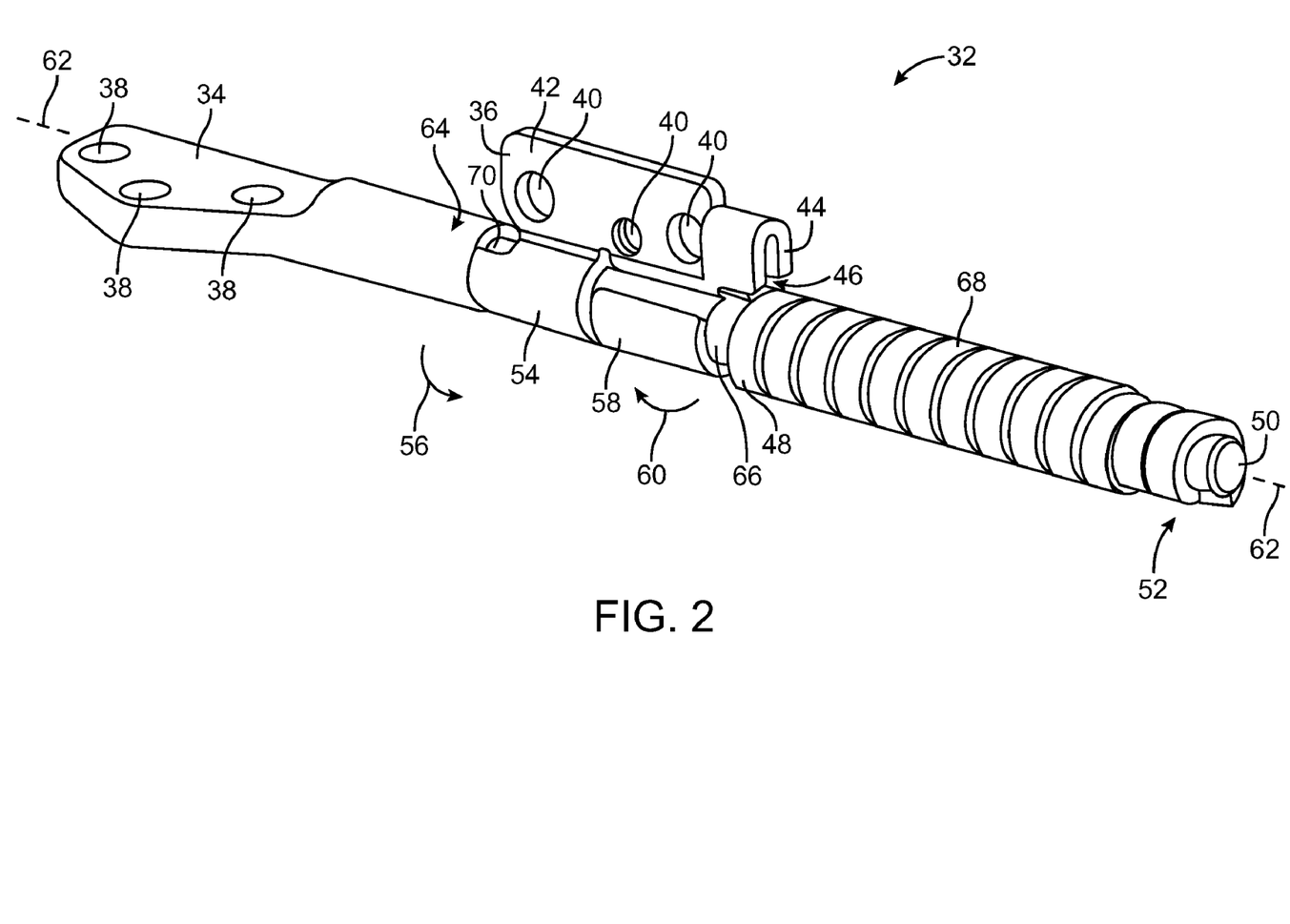
FIG. 2 is a perspective view of an illustrative hinge clutch mechanism in accordance with an embodiment of the present invention.

A hinge clutch mechanism that addresses these issues is shown in FIG. 2. As shown in FIG. 2, clutch 32 may have a base mount structure 34 and a friction band structure 36. Base mount 34 may have holes 38 through which screws may be passed to screw base mount 34 to lower housing portion 28. Friction band 36 may have holes 40 in planar surface 42 through which screws may be passed to screw friction band 36 into upper housing portion 26. When opening and closing upper housing portion 26 (i.e., the lid of computer 10), base mount member 34 tends to remain stationary, while friction band 36 rotates relative to base mount 34 about rotational axis 62.

The movement of friction band 36 relative to base mount 34 is opposed by friction and by the tension of spring 68. Spring 68 may be formed from a spring member formed in a spiral shape around shaft 50. Friction is provided using two friction bands that engage shaft 50. Friction band 54 is wrapped partly around shaft 50 in direction 56, whereas friction band 58 is wrapped partly around shaft 50 in direction 60. Because bands 54 and 58 are wrapped in opposing directions, when the friction of one band is weakened, the other will be strengthened. In particular, as the grip of one band on shaft 50 is being loosened due to "unwrapping," the grip of the other band on shaft 50 is being strengthened due to "wrapping."

Shaft 50 may be attached to base mount 34 through a press fit at attachment point 64. At end 52 of shaft 50, spring 68 may be press fit to shaft 50. Shaft 50 may have a structure that helps form a non-slipping attachment to spring 68. For example, shaft 50 may be augmented with a gripping texture, a knurl, glue, facets, etc. These features may be used to prevent slippage between spring 68 and shaft 50. Sleeve 66 may provide lubrication as spring 68 is tightened and relaxed.

Bent portion 44 may be crimped over an end of spring 68 in slot 46. Directly attaching friction band 36 to spring 68 in this way avoids the need for complex multielement parts for forming friction band 36. For example, friction band 36 may be formed from a single piece of patterned and bent sheet metal (as an example).

Spring 68 may be formed from a spring metal (e.g., music wire). Shaft 50, base member 34, and friction band 36 may be formed from metal such as steel. Sleeve 66 may be formed from plastic or other durable material.

Figure 3:
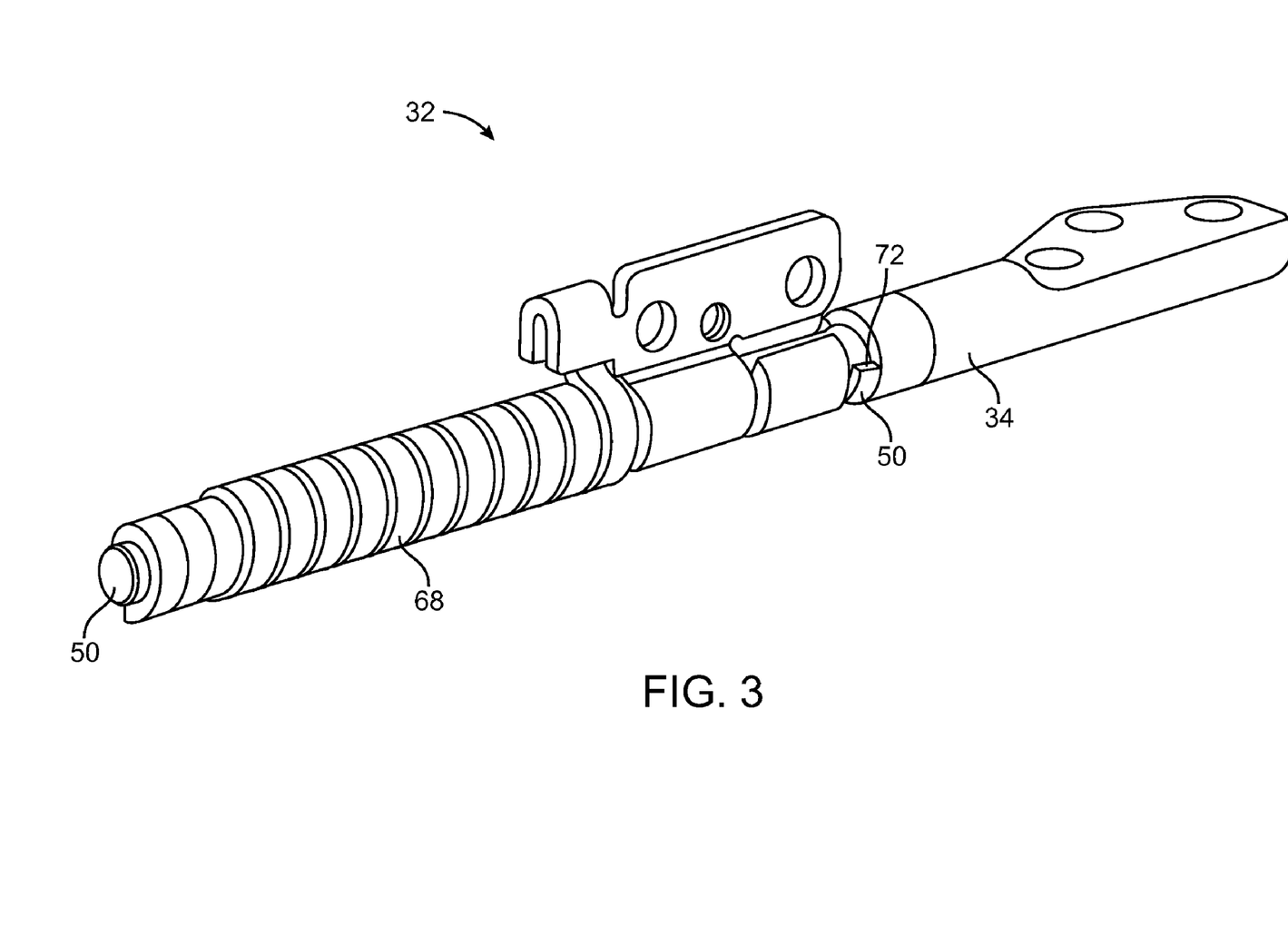
FIG. 3 is a perspective view of an illustrative hinge clutch mechanism showing how a friction band in the mechanism may have a stop structure in accordance with an embodiment of the present invention.

Friction band 36 may have a stop feature 70. When cover 26 of computer 10 is opened to its maximum extent, stop 70 will bear against mating stop feature 72 of FIG. 3. As shown in FIG. 3, stop 72 may be formed as a shelf that is an integral part of shaft 50. If desired, stop 72 may be formed from an extended portion of base mount 34.

Figure 4:
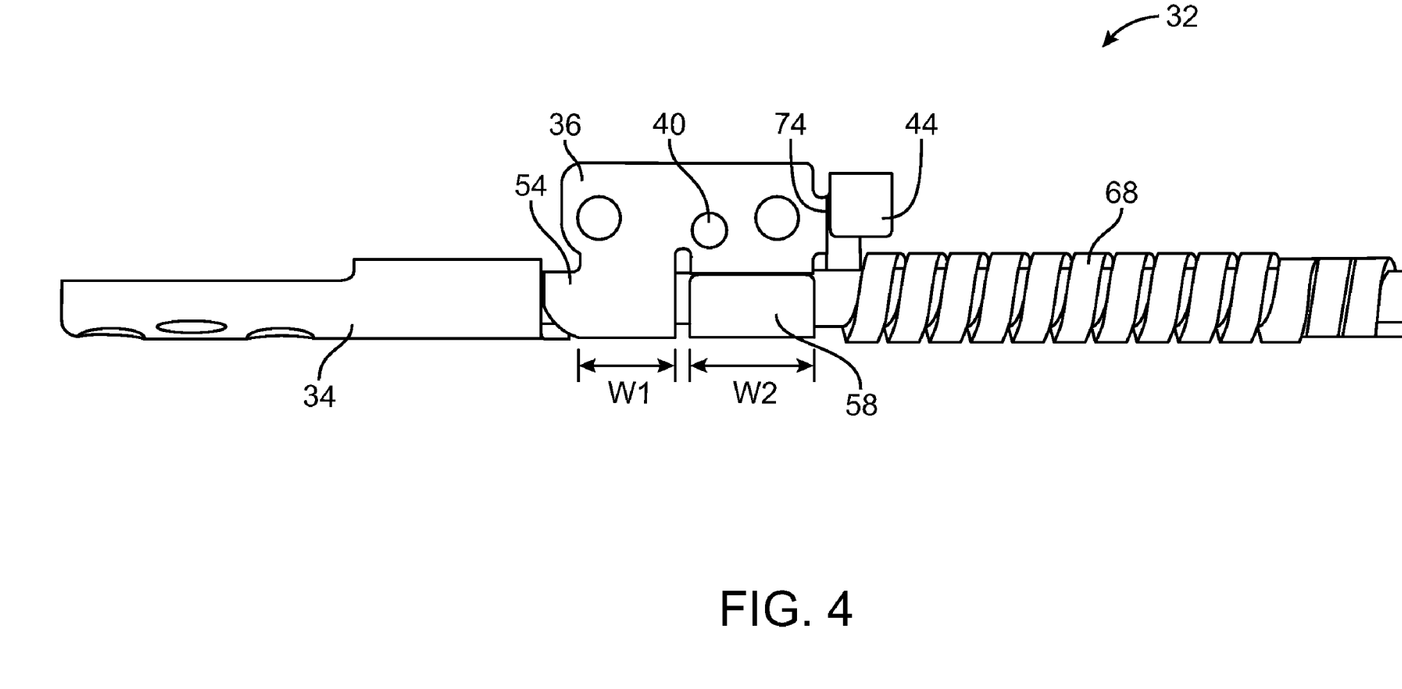
FIG. 4 is a side view of an illustrative hinge clutch mechanism showing how the end of a clutch spring may be directly attached to a bent portion of a friction band in accordance with an embodiment of the present invention.

FIG. 4 shows how end 74 of spring 68 may be directly attached to bent portion 44 of friction band 36. Central screw hole 40 may help to provide additional holding power when attaching friction band 36 to display housing 26.

As shown in FIG. 4, the width W1 of band 54 may be different than the width W2 of band 58. As a result, the rotational friction that is produced by bands 54 and 58 may not be equal. In this type of situation, clutch 32 may be referred to as exhibiting asymmetric friction. In the example of FIG. 4, width W2 is about 25% larger than width W1, so the friction imposed by clutch 32 when friction band 36 is rotated in direction 60 relative to base unit 38 (i.e., when opening cover 26) is less than the friction imposed by clutch 32 when friction band 36 is rotated in direction 56 relative to base unit 38 (i.e., when closing cover 26). This asymmetrical force distribution can improve the operation of hinge 18.

For example, the relatively higher closing friction that is produced may combat "kickback" of display 26 from spring 68 in certain usage scenarios (i.e., when using computer 10 with display 26 wide open and holding base 28 at an angle relative to the ground). The higher closing friction provided by an asymmetrical friction band may also help to prevent cover 26 from falling closed. The lighter opening friction provided by band 54 may be desirable to provide a light-to-the touch user experience. The lighter opening friction may also avoid situations in which the base is lifted from the table as the user opens the laptop display.

Figure 5:
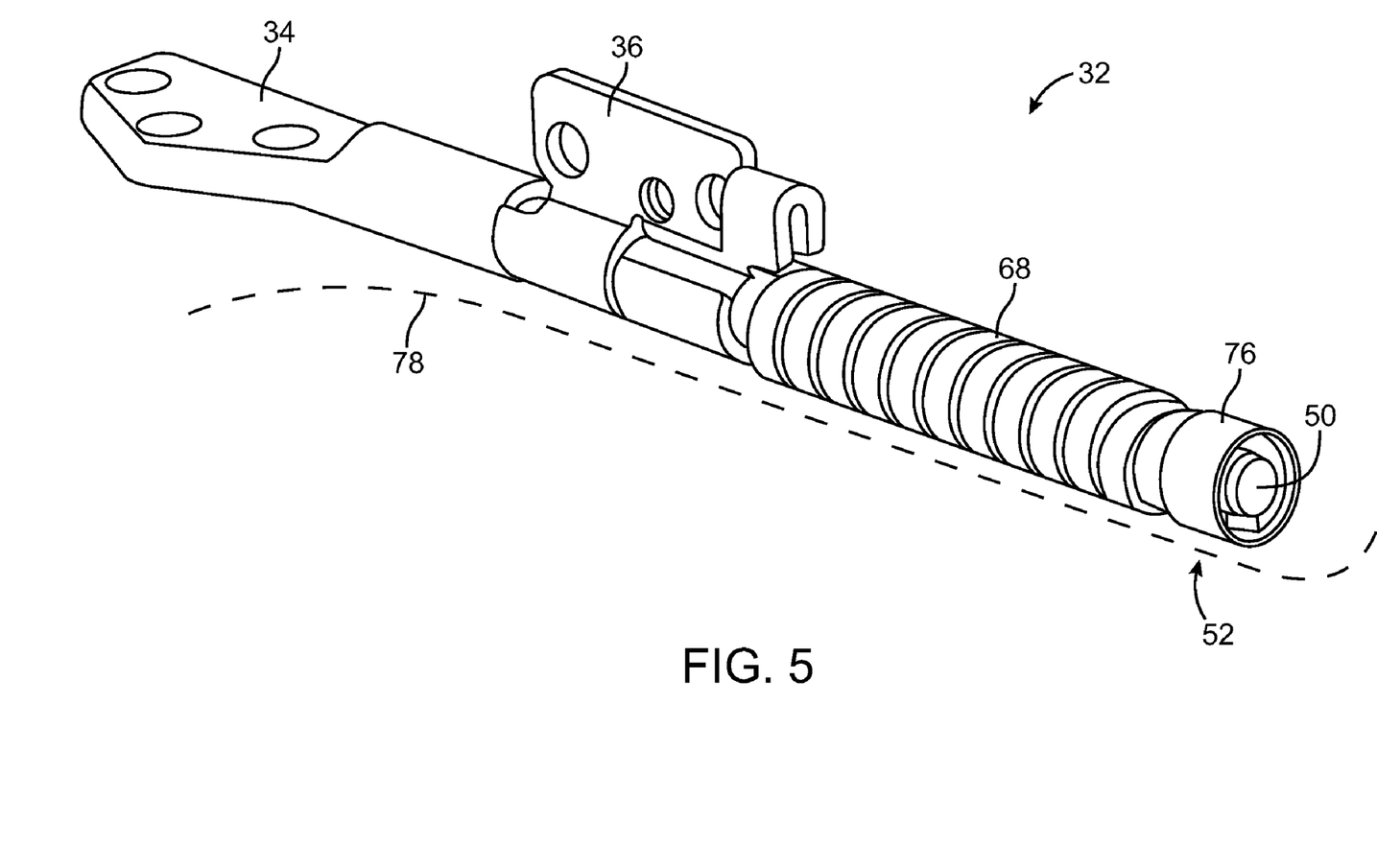
FIG. 5 is a perspective view of an illustrative hinge clutch mechanism showing how a cable may be routed along the length of the clutch mechanism when the clutch mechanism is used within the clutch barrel of a portable computer housing and how a protective cap may be used to prevent cable damage in accordance with an embodiment of the present invention.

In some situations it may be desirable to run cables through hinge 18 from lower housing portion 28 to upper housing portion 26. An illustrative path that may be traced by a cable is shown in FIG. 5. As shown in FIG. 5, cable 78 may pass tip region 52 of shaft 50. To prevent wear to cable 78 from spring 68 in region 52, a protective member such as protective cap 76 may be used to cover tip 52 of shaft 50 and spring 68. This may help to ensure longer cable life as a user repeatedly opens and closes cover 26. Protective cap 76 may be formed from an open ring-shaped structure or may be formed from a closed bowl-shaped structure. Metal, plastic, or other suitable materials may be used to form protective cap 76. Cap 76 may be attached using adhesive, by press fitting cap 76 onto spring 68 and shaft 50, etc.

Figure 6:
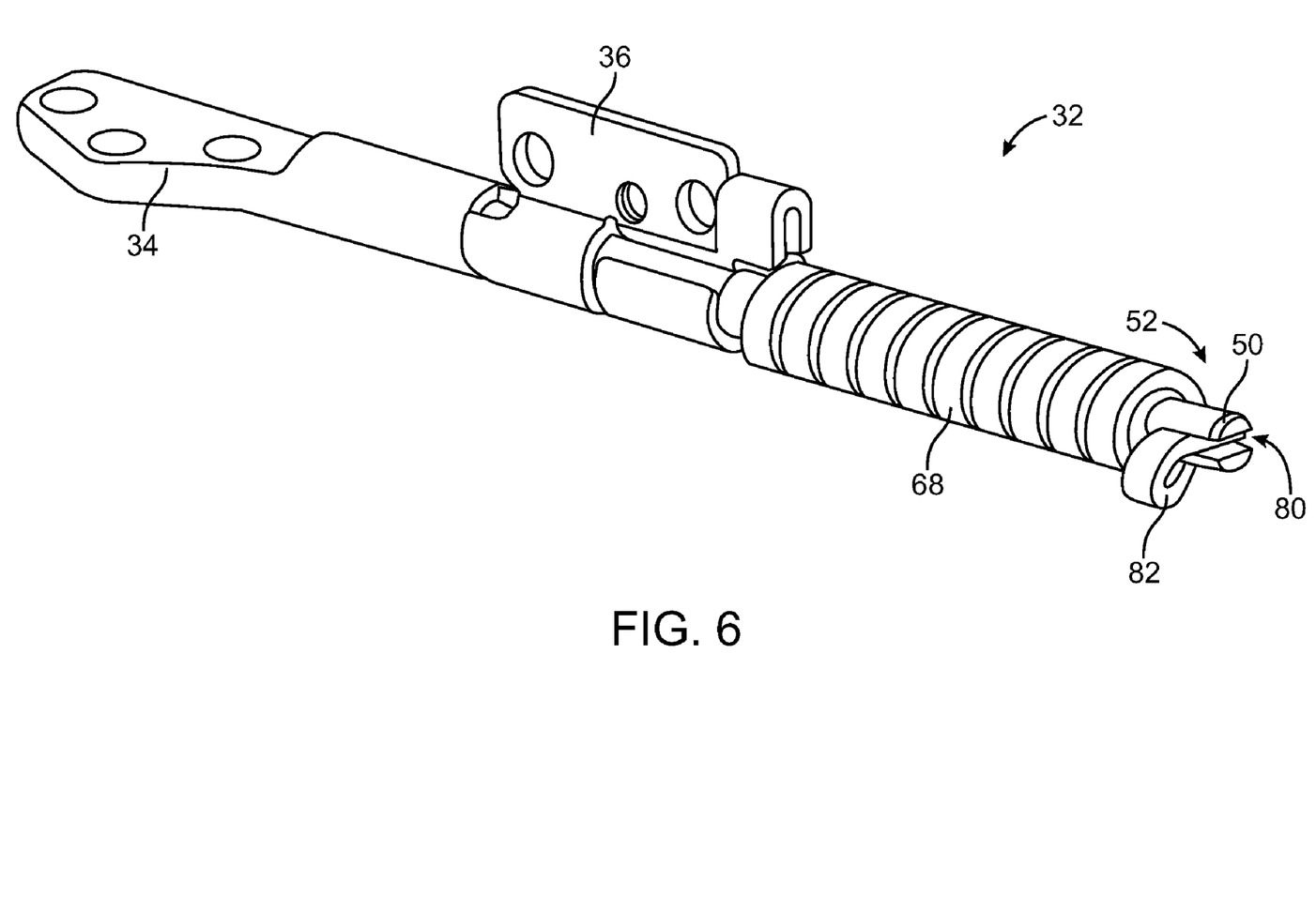
FIG. 6 is a perspective view of an illustrative hinge clutch mechanism showing how a clutch shaft may be provided with a slot at its tip to receive a clutch spring and how the spring may have a stress relief lobe to enhance reliability in accordance with an embodiment of the present invention.

As shown in FIG. 6, shaft 50 may be provided with a slot at tip 52 such as slot 80. The end of spring 68 may be press fit into slot 80. A lobe such as lobe 82 may be provided in spring 68 in the vicinity of the slot attachment point to provide stress relief for spring 68 and thereby enhance reliability.

Figure 7:
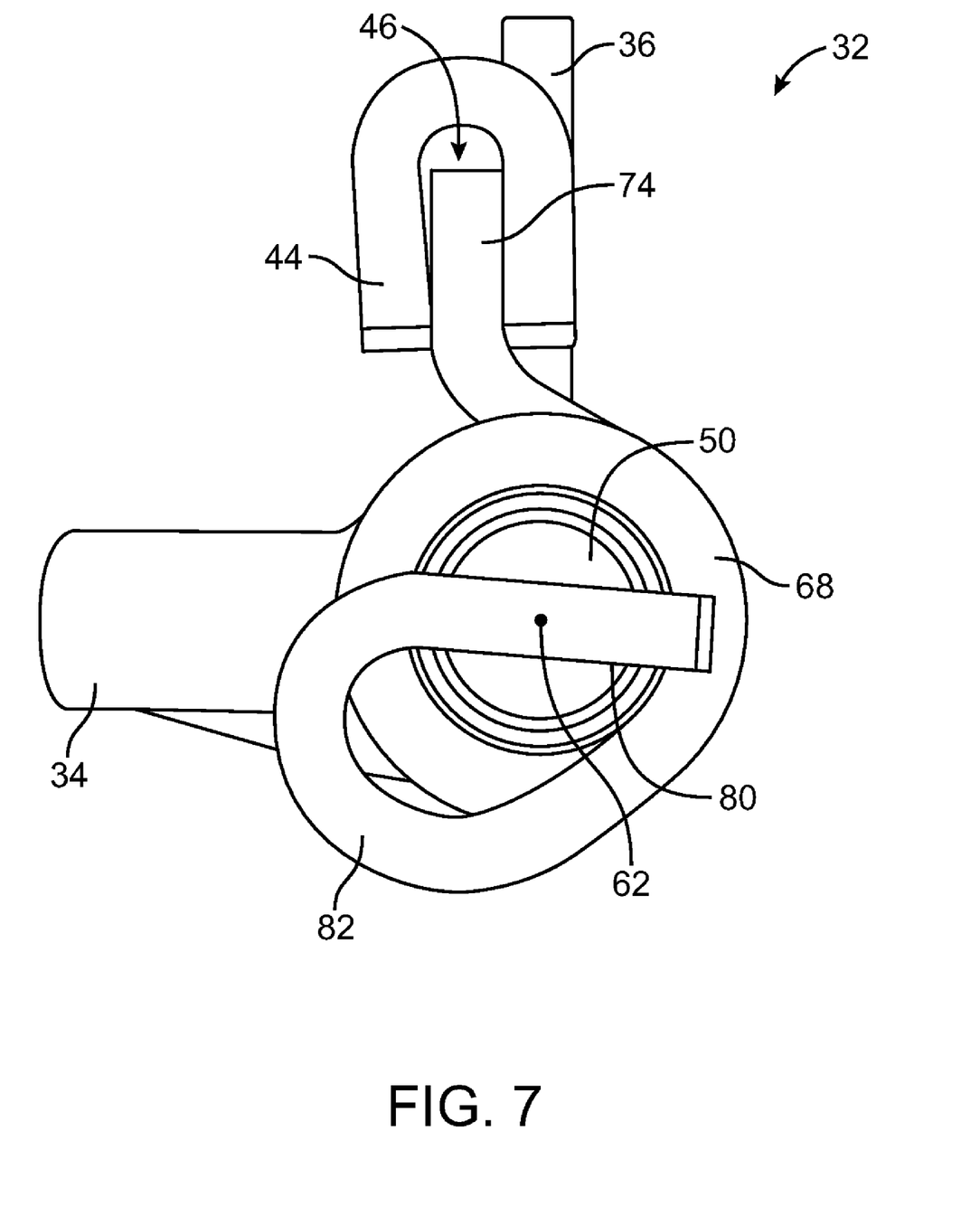
FIG. 7 is an end view of an illustrative hinge clutch mechanism showing how the end of a clutch spring may be directly gripped by a bent portion of a friction band in accordance with an embodiment of the present invention.
Figure 8:
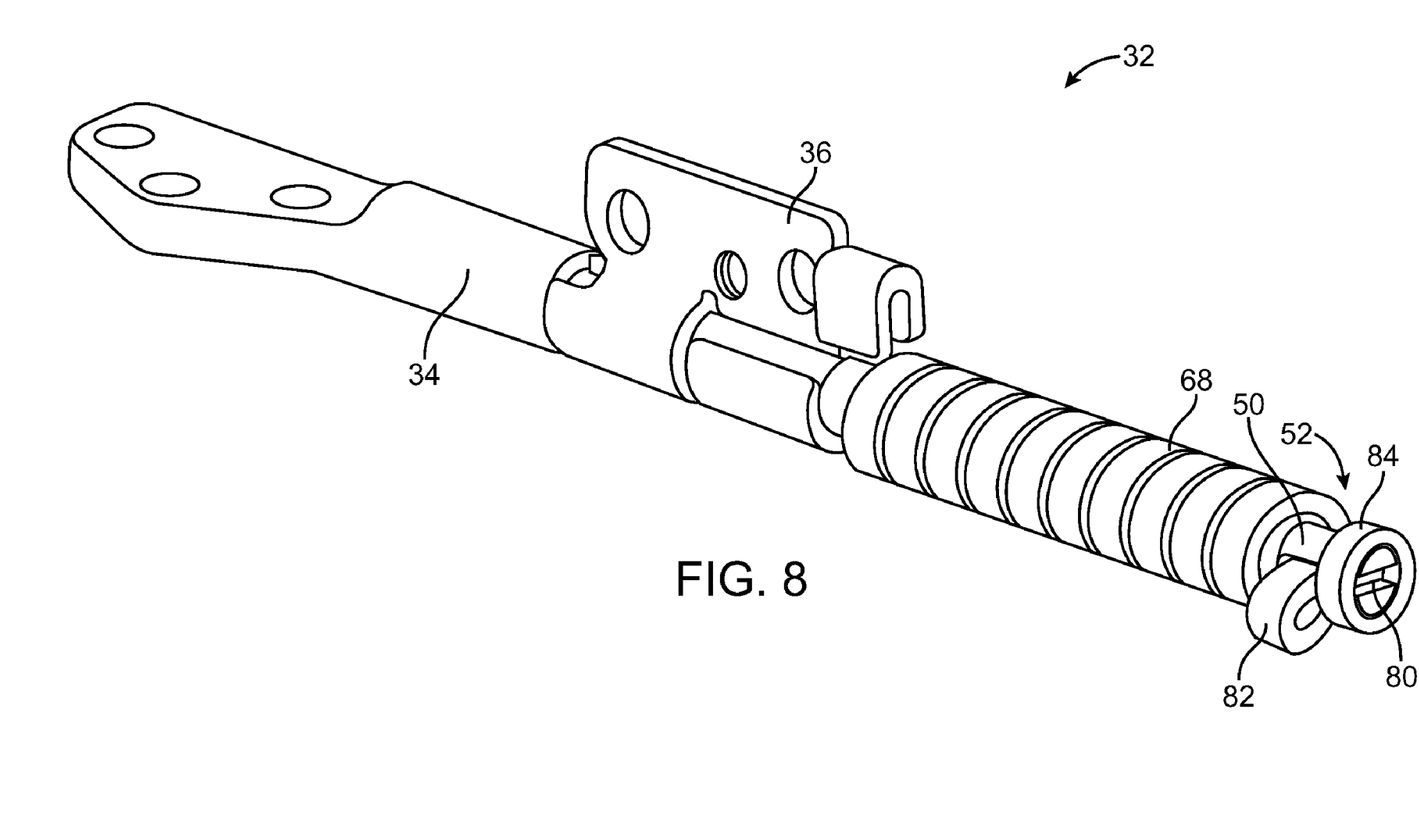
FIG. 8 is a perspective view of an illustrative hinge clutch mechanism showing how an annular retainer ring may be press fit onto the end of a clutch shaft to help hold the end of a clutch spring to the shaft in accordance with an embodiment of the present invention.

An end view of clutch 32 showing how end 74 of spring 68 may be directly gripped in gap 46 by bent portion 44 of friction band 36 is shown in FIG. 7. FIG. 7 also shows how lobe 82 may extend outward from rotational axis 62 to ensure that spring 68 does not experience a sharp bend at slot attachment point 80. As shown in FIG. 8, an annular retainer such as retainer ring 84 may be press fit onto end 52 of shaft 50 and spring 68. Retaining structures such as ring 84 may help to compress slot 80 onto the end of spring 68 and may help to retain lobe 82. Retaining structures may thereby ensure a secure attachment between spring 68 and shaft 50 and improve reliability. Ring 84 may be configured to strengthen shaft 50 and resist stresses caused by spring 68 during hinge cycling. If desired, retaining structure 84 may be configured to serve as a protection structure such as protection structure 76 of FIG. 5.

Spring 68 provides a counterbalanced force for hinge 68. The neutral point for spring 68 may be configured to coincide with a roughly vertical position for upper housing 26 relative to lower housing 28. When a user opens upper housing 26 past this amount, spring 68 unwinds and exhibits an opposing (closing) force. This return force helps to prevent cover 26 from falling open and, when a user is closing the cover from a very open position, this force assists the user in overcoming gravity. When a user closes housing 26 past the neutral position, spring 68 is tightened. When spring 68 is tightened in this way, spring 68 generates an opposing (opening force) on cover 26.

The counterbalanced nature of clutch spring 68 therefore helps to stabilize the motion of cover 28. If desired, cover 26 and base 28 of computer 10 may be provided with magnetic latch structures (illustrated as magnetic structures 15 in FIG. 1). These magnetic structures may be formed by combinations of magnets and magnetic materials such as steel. When the user closes cover 26, the magnetic latch structures hold cover 26 closed. Magnetic latch mechanisms such as these typically exert a force, even at a distance.

Figure 9:
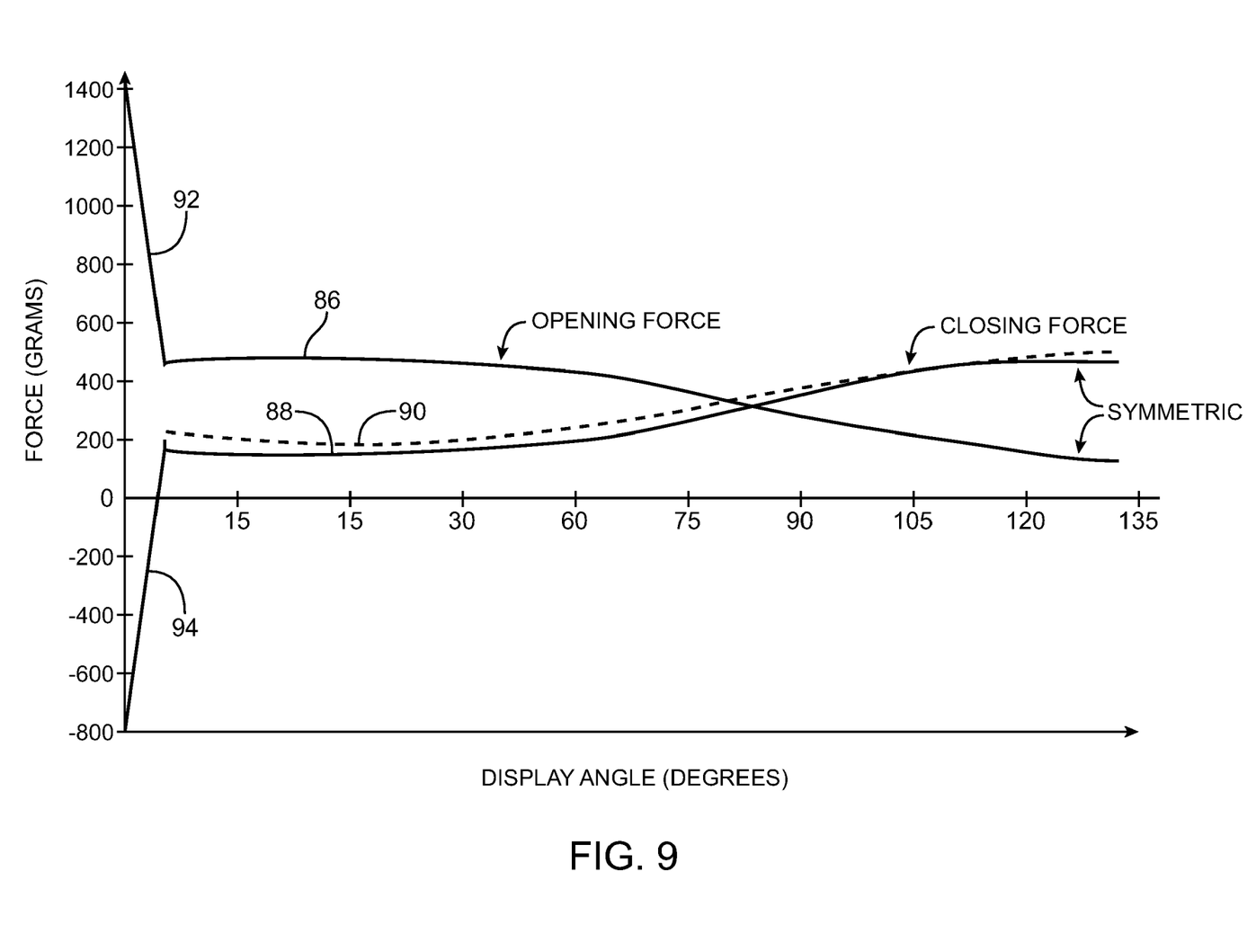
FIG. 9 is a graph showing the forces involved when using a counterbalanced clutch in a laptop computer with magnetic latches in accordance with an embodiment of the present invention.

A graph showing the forces involved when using a counterbalanced clutch 32 in a laptop computer with magnetic latches such as magnetic latch structures 15 of FIG. 1 is shown in FIG. 9. At small display angles, the top edge of cover 26 is near to the near edge of lower housing portion 28. In this situation, magnets 15 are close to each other and exhibit strong forces, as indicated by line segments 92 and 94.

Counterbalance spring 68 in clutch 32 creates opening force and closing force curves that intersect when display 26 is nearly vertical (i.e., when the spring contribution to the clutch force is minimal because spring 68 is at its neutral position). Inclusion of counterbalance spring 68 in clutch 32 helps to provide lower operating forces and more uniform operating forces. The need for strong friction from the friction band 36 is also reduced. Friction from bands 54 and 58 is, however, advantageous in that this friction helps to arrest unwanted motion of display 26. If desired, the friction bands in clutch 32 may be sized equally to provide symmetric friction (i.e., equal opening and closing frictions). In this situation, the opening and closing forces exhibited by display 26 will be characterized by solid lines 86 and 88. The use of unequally sized friction bands such as bands 54 and 58 of FIG. 2 provides clutch 32 with asymmetric friction (i.e., unequal opening and closing frictions). If band 58 is made larger than band 54, the increased closing friction contribution of band 58 may help to prevent display 26 from being too easy to close without providing the hinge with excess friction. This is illustrated by dashed line 90, which corresponds to the closing force exhibited by an asymmetric clutch such as clutch 32.

The foregoing is merely illustrative of the principles of this invention and various modifications can be made by those skilled in the art without departing from the scope and spirit of the invention.

What is claimed is:

1. Hinge clutch structures for a portable computer hinge that connects first and second housing portions in a portable computer, comprising:
    a base mount structure having an associated shaft with a longitudinal axis;
    a friction band structure that rotates relative to the shaft about the longitudinal axis and that has a first friction band and a second friction band, wherein the first and second friction bands are wrapped around the shaft in opposing directions, wherein the first and second friction bands have respective first and second widths along the shaft, and wherein the first and second widths are different; and
    a clutch spring disposed in a spiral around the shaft, wherein the shaft comprises an end having a slot, wherein the spring is attached to the shaft at the slot, and wherein the spring has a stress relief lobe adjacent to the slot.

2. The hinge clutch structures defined in claim 1 wherein the friction band structure comprises a stop structure that stops rotation of the base mount structure and the shaft relative to the friction band at a particular rotational orientation of the friction band structure relative to the shaft.

3. The hinge clutch structures defined in claim 2 wherein the spring is connected between the shaft and the friction band structure, wherein the friction band structure has a portion that is crimped over a portion of the spring.

4. The hinge clutch structures defined in claim 1 wherein the friction band structure has a bent portion crimped over the end of the clutch spring.

5. The hinge clutch structures defined in claim 1 further comprising:
    an annular retainer ring that is press fit onto the end of the shaft to retain the attached spring.

6. The hinge clutch structures defined in claim 1 wherein the spring is connected between the shaft and the friction band structure.

7. The hinge clutch structures defined in claim 6 wherein the base mount structure is attached to the first housing portion, wherein the friction band structure is attached to the second housing portion, and wherein the different first and second widths create asymmetric opening and closing forces when the first and second housing portions are opened and closed with respect to each other.

8. A portable computer, comprising:
    an upper housing that contains a display;
    a lower housing;
    a hinge with which the upper housing is rotatably attached to the lower housing, wherein the hinge has friction band structures including first and second friction bands of unequal widths along a hinge shaft;
    magnetic latch structures mounted to the upper and lower housings that hold the upper housing in place against the lower housing.

9. The portable computer defined in claim 8 wherein the hinge has a base mount structure attached to the lower housing and wherein the friction band structures are attached to the upper housing.

10. The portable computer defined in claim 9 wherein the hinge comprises a spring having one end connected to the shaft and another end connected to the friction band structures.

11. The portable computer defined in claim 10 wherein shaft is press fit into the base mount structure and wherein the friction band structures have a portion that is crimped over the end of the spring that is connected to the friction band structures.

12. The portable computer defined in claim 11 wherein the friction band structures have a stop structure and wherein the shaft comprises a shelf that arrests relative motion of the friction band and the shaft when the stop structure contacts the shelf.

13. A hinge clutch that connects upper and lower housing portions in a portable computer, comprising:
   a shaft;
   friction band structures that rotate relative to the shaft, wherein the friction band structures comprise first and second friction bands wrapped around the shaft that create friction that opposes relative rotational movement between the shaft and the friction band structures; and
   a spring connected between the shaft and the friction band structures, wherein the friction band structures have a portion that is crimped over an end of the spring, wherein the spring has a neutral point that coincides with the upper housing portion having a roughly vertical position relative to the lower housing portion, wherein the spring provides a closing force when the upper housing portion is opened past the roughly vertical position relative to the lower housing portion, and wherein the spring provides an opening force when the upper housing portion is closed past the roughly vertical position related to the lower housing portion.

14. The hinge clutch defined in claim 13 wherein the first friction band has a first dimension along the shaft, wherein the second friction band has a second dimension along the shaft that is different than the first friction band, and wherein the shaft has a slot that receives the spring at an end of the spring opposite to the end of the spring over which the portion of the friction band structures is crimped.

15. The hinge clutch defined in claim 14 further comprising:
   an annular retainer ring located over the end of the spring received in the slot, wherein the annular retainer ring compresses the slot of the shaft onto the end of the spring received in the slot; and
   a protective cap located over the shaft and over the end of the spring received in the slot.

* * * * *

UNITED STATES PATENT AND TRADEMARK OFFICE
CERTIFICATE OF CORRECTION

PATENT NO. : 8,132,293 B2
APPLICATION NO. : 12/335520
DATED : March 13, 2012
INVENTOR(S) : Brett W. Degner et al.

It is certified that error appears in the above-identified patent and that said Letters Patent is hereby corrected as shown below:

In the Claims:

Column 6, lines 25 and 26 "the spring" should read --the clutch spring--.

Column 6, line 36 "the spring." should read --the clutch spring.--.

Column 6, line 43 "the spring." should read --the clutch spring.--.

Column 6, line 60 "hinge shaft;" should read --hinge shaft; and--.

Column 7, line 7 "crimped over the" should read --crimped over an--.

Column 7, line 13 "when the stop" should read --when a stop--.

Signed and Sealed this
Twenty-third Day of December, 2014

Michelle K. Lee
*Deputy Director of the United States Patent and Trademark Office*